May 5, 1942.  H. L. NEWELL  2,282,082
COOKING APPARATUS
Filed Dec. 15, 1939
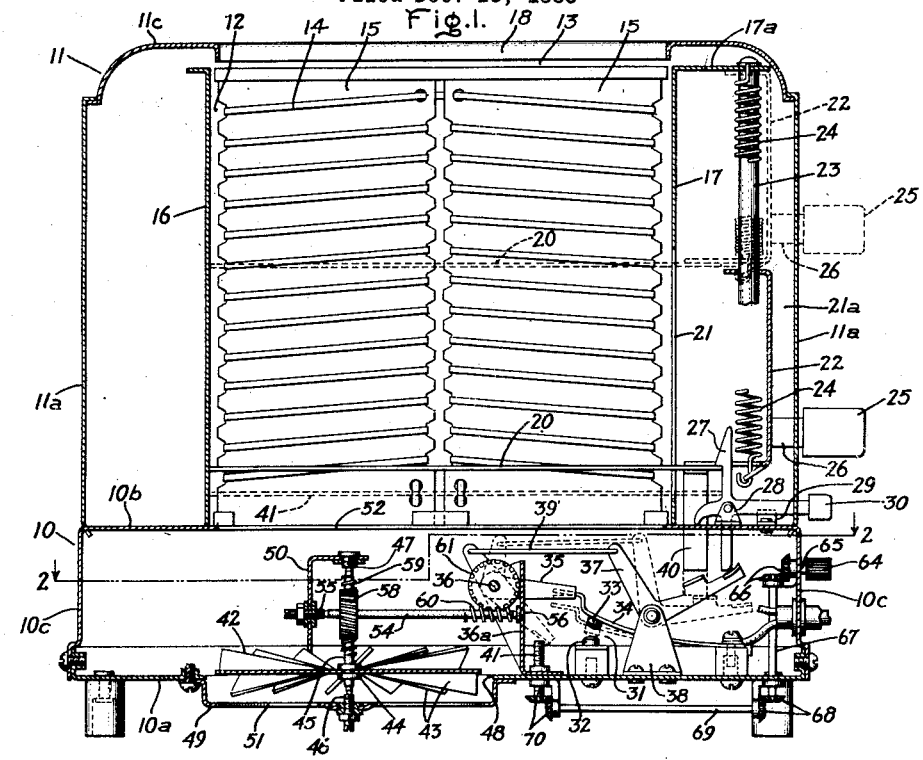
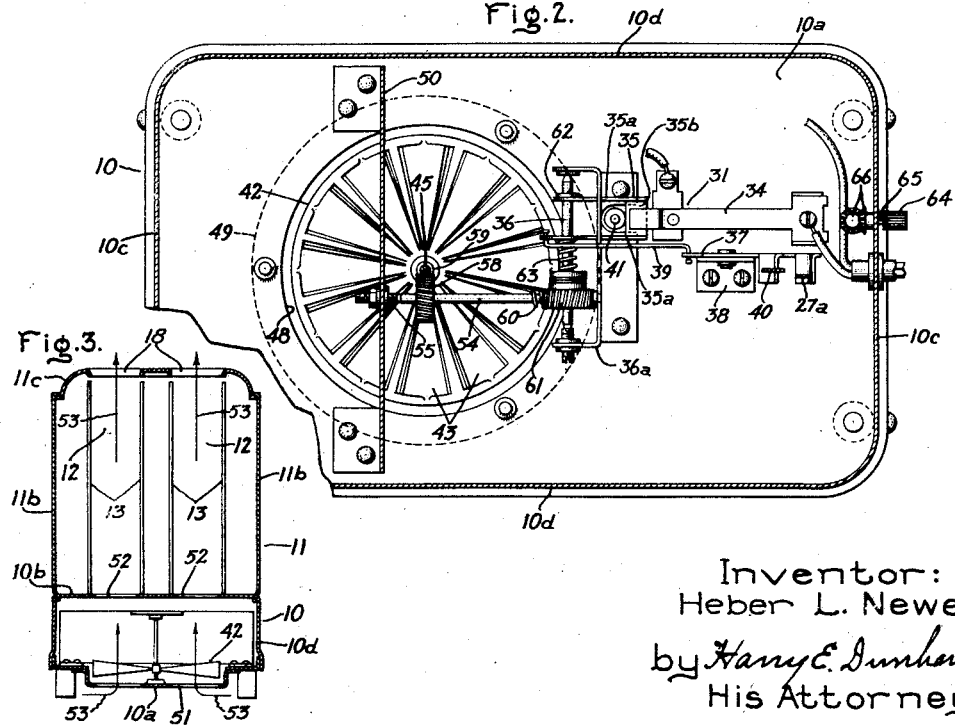
Inventor:
Heber L. Newell,
by Harry E. Dunham
His Attorney.

Patented May 5, 1942

2,282,082

UNITED STATES PATENT OFFICE 2,282,082

COOKING APPARATUS

Heber L. Newell, Stratford, Conn., assignor to General Electric Company, a corporation of New York Application December 15, 1939, Serial No. 309,428

7 Claims. (Cl. 219—19)

This invention relates to cooking apparatus, more particularly to electric cooking apparatus, and it has for its object the provision of improved cooking apparatus having means for timing automatically the cooking operation.

In cooking apparatus where the edible is cooked in a series of successive cooking operations, such as in electric toasters, waffle irons, and the like, the cooking apparatus becomes increasingly hotter with successive operations until a substantially stable temperature is attained. Where each cooking operation has the same time interval, it is not possible to obtain a uniformly cooked product; that is, the edible of a succeeding cooking operation is not cooked to the same degree as that of the preceding operation; if the edible cooked initially when the cooking apparatus is cold is properly heated to the desired degree during the cooking interval, then it is likely that the edibles in succeeding cooking operations will be over-cooked or burned; and if the final stable temperature is correct for the cooking operations, then the edibles cooked initially when the cooking apparatus is cold will be under-cooked.

This invention contemplates the provision of improved cooking apparatus having timing means that measures the successive cooking intervals, and varies their duration so as to compensate for variations in the temperature of the cooking apparatus, that is, for variations in the stored heat of the cooking apparatus.

In accordance with this invention, suitable means are provided for creating an air draft, the velocity of which depends upon the temperature of the cooking apparatus; and suitable control means are provided for terminating the cooking operation responsively to the velocity of the air draft. In one form of the invention, suitable control means are provided for terminating the cooking operation operated by a wind wheel placed within the air draft so that its speed varies with the velocity of the air draft. Consequently, the speed of the wind wheel is a measure of the temperature of the cooking apparatus, and compensates directly for stored heat. The control means operates to reduce the duration of the cooking interval when the speed of the wheel increases, and to increase the duration of the cooking interval when the speed of the wind wheel decreases.

For a more complete understanding of this invention, reference should be had to the accompanying drawing in which Fig. 1 is a vertical sectional view illustrating an electric toaster embodying this invention; Fig. 2 is a sectional view taken through the line 2—2 of Fig. 1 and looking in the direction of the arrows; and Fig. 3 is a vertical sectional view taken through a portion of the toaster of Figs. 1 and 2 and made on a smaller scale than Figs. 1 and 2.

Referring to the drawing, this invention has been shown as applied to an electric toaster having a base 10 upon which is mounted a housing 11. The base 10, as shown, is of box-like form having a bottom wall 10a, a top wall 10b, end walls 10c, and side walls 10d. The casing 11 also is of box-like form having end walls 11a, side walls 11b (Fig. 3), and a top wall 11c. Within the housing 11 is a pair of heating chambers 12, each of which is heated by a pair of electrical heating elements 13 positioned on opposite sides of the heating chamber. The heating elements may be of any suitable construction but preferably will be formed of a suitable resistance conductor 14 wound upon a suitable sheet 15 of electrically insulating material, such as mica. As shown, the heating chambers are closed at the sides by the heating elements, and at the ends by walls 16 and 17. The top wall 11c is provided with an elongated opening 18 at the top of each heating chamber through which slices may be inserted and withdrawn.

Mounted within each heating chamber 12 is a movable slice support 20 which is movable from a toasting position in which it is shown in solid lines in Fig. 1 to an upper non-toasting position in which it is shown in dotted lines in this figure. Each slice holder projects through an elongated vertical opening 21 provided for it in the wall 17 into a chamber 21a between this wall and the front wall 11a of the casing. In this chamber 21a is a suitable slice holder supporting carriage 22 to which all of the slice holders are connected. The carriage 22 is mounted to slide vertically on a vertical rod 23 mounted within the chamber 21a. Also mounted within this chamber is a tension spring 24 anchored at its upper end to a projection 17a on the wall 17, and at its lower end to the carriage 22, as shown. The carriage is provided with an opening handle 25 accessible at the front of the toaster, as shown, and which is connected to the carriage by means of an operating tongue 26 secured to the carriage and handle and projecting through an elongated vertical opening (not shown) provided for it in the front wall 11a.

The carriage is latched in its lower or toasting position against the force of the spring 24 by means of a latching member 27 which engages the forward end of the holder 20, as shown in Fig. 1. The latch 27 is pivotally mounted on standards 28 and is biased counter-clockwise in the latching direction by means of a leaf spring 29. Thus, when the knob 25 is depressed from its dotted line non-toasting position of Fig. 1 to its solid line toasting position of this figure it will move the slice holders 20 down to their toasting positions and the holders will be held in their toasting positions by means of the latch 27. The latch 27 is provided with an operating knob 30 accessible at the front of the toaster so that the latch can be released at any time that it is desired to do so.

At the same time that the knob 25 is depressed to move the slice holders 20 to their toasting positions, the heating elements 13 are energized, and they are subsequently deenergized by a suitable time-controlled mechanism. As shown, a suitable switch 31 is mounted in the base 10 for controlling the heating elements 13. This switch comprises a fixed contact 32 mounted on the bottom wall 10a of the base, and a movable contact 33 cooperating therewith that is mounted on a flexible switch arm 34; one end of the switch arm 34, as shown, is also anchored to the bottom wall 10a of the base, and the arm is so arranged that its end opposite the anchored end biases the contact 33 into engagement with the contact 32. It will be understood that the switch contacts 32 and 33 will be connected in series with the resistance conductors 14 so that when the contacts are closed the heating elements 13 will be energized, whereas when the contacts are opened the heating elements will be deenergized.

The contact arm 34 is operated to its open position by means of a bell-crank-shaped bracket 35 mounted upon a shaft 36 that is journaled in a bracket 36a on the bottom wall 10a. One arm of the bell crank, as shown, has two spaced parts 35a carrying a web 35b between that cooperates with the arm 34 so that when the bracket is moved in the counter-clockwise direction, as viewed in Fig. 1, it will engage the spring arm 34 to move the contact 33 away from the fixed contact 32; conversely, when the bracket 35 is moved in the opposite direction the web 35b will permit the switch arm 33 to close the contacts 32 and 33.

The bracket 35 is moved in its circuit-closing direction by means of a bell-crank-shaped arm 37 pivotally mounted upon standards 38 attached to the bottom wall 10a of the toaster. As shown, one arm of this bracket, the left-hand arm, as viewed in Fig. 1, is connected to the corresponding arm of the bell crank bracket 35 by means of a link 39. When the toaster trays are lowered, the bell crank arm 37 is moved in the clockwise direction, as viewed in Fig. 1 to operate the bracket 35 to close the switch by means of an arm or rod 40 rigidly secured to the trays and depending through an aperture provided for it in the upper wall 10b of the base 10. The rod 40 is arranged when the knob 25 is depressed to engage the bell crank 37 to cause the closing of the switch contacts 32 and 33. It is contemplated that when the knob 25 is depressed it will move the trays 20 to a somewhat lower position than their normal toasting positions, which position is shown in dotted lines in Fig. 1 and designated by the numeral 41. This operation of the knob 25 will move the bell cranks 35 and 37 to their dotted line positions shown in Fig. 1; these positions are defined by a stop 41 in the bottom wall 10a and positioned to engage the bell crank 35, as shown. When the bell cranks have been moved to these positions, the knob 25 is released and the trays 20 return to their full line positions shown in Fig. 1 where the latch 27 engages them, and which operation withdraws the depending arm 40 from the bell crank 37 which remains in its dotted line position.

The bracket 35 is moved by suitable timing mechanism from the stop 41 in a counter-clockwise direction to engage the switch arm 34 to open the switch at the end of the toasting interval. For this purpose, a suitable wind wheel or wind motor 42 is mounted in the bottom wall 10a of the base. As shown, the wind wheel is provided with a series of vanes 43 which are attached to a central hub 44. The hub 44 is mounted on a vertically positioned shaft 45 which has its lower end mounted in a bearing 46 and its upper end mounted in a bearing 47. The bottom wall is provided with a circular opening 48, and the bearings 46 and 47 are located so that the wind wheel lies substantially within the plane of this opening; as shown, the lower bearing 46 is mounted in a depressed member 49 attached to the bottom wall, while the upper bearing 47 is mounted in a bracket 50, mounted on the bottom wall 10a. The depressed section 49 is provided with a series of openings 51 through which a draft of air may flow directly through the wind wheel 42. This draft flows through these openings 51, upwardly through elongated openings 52 provided in the top wall 10b of the base under the toasting chambers 12, and thence through the toasting chambers 12 and top openings 18 in the top wall 11c of the toaster, as indicated by the arrows 53 in Fig. 3. It will be understood that the draft will be induced to flow up through the toaster as through a chimney by the heating means 13, when energized.

Rotation of the wind wheel is imparted to the bracket 35 through a shaft 54 having one end mounted in a bearing 55 in the bracket 50 and its other end in a bearing 56 in the bracket 36a. The shaft 54 carries a worm wheel 58 which meshes with a worm 59 on the vertical shaft 45, and the shaft 54 has a worm 60 which drives a worm wheel 61. The worm wheel 61 drives the shaft 36 upon which the bracket 35 is mounted so that when the wind wheel rotates it will rotate the bracket to move it in the counter-clockwise direction from the stop 41, and at the end of a predetermined interval, which interval depends upon the speed of the wind wheel, the bracket 35 will engage the switch arm 34 to open the switch and thereby deenergize the toaster to terminate the toasting operation. It will be evident that the toasting interval will depend upon the speed of the wind wheel because it requires a fixed number of revolutions of this wheel to operate the bracket 35 from the stop 41 until it engages the switch arm 34 to open the contacts. If the speed of the wind wheel is increased, it turns the required number of revolutions to open the contacts in less time, and conversely if the speed of the wind wheel is decreased it turns the required number of revolutions to open the contacts in a greater length of time.

The bell crank 37 may be used to trip the latch 27 to release the bread trays 20 and thereby permit the spring 24 to elevate the bread trays to their non-toasting positions. In this case, it is preferable that the switch 31 be operated by the carriage 22.

It is to be understood that the bracket 35 has a friction connection with the shaft 36 so that when the trays are depressed for the toasting operation the bracket 35 may be moved to its dotted line position of Fig. 1 while the shaft 36 remains stationary. For this purpose, the bracket is biased againts a stop 62 mounted on the shaft 36 by means of a compression spring 63. It will also be understood that the connection between the stop 62 and bracket 35 provides sufficient frictional force to drive the bracket from the stop 41 when the wind wheel 42 operates.

As pointed out previously, the toasting interval is determined by the speed of the wind wheel 42. The speed of the wind wheel 42 will depend, of course, upon the velocity of the air draft flowing through the toaster. This velocity will depend upon the temperature of the toaster,—the higher the temperature the greater the draft velocity, and the lower the temperature the lower the draft velocity. When the toaster is cold and first energized the draft will have a very low velocity and so the wind motor will have a very low speed. Consequently, at first a comparatively long toasting period will be measured. This is desirable because the toaster is cold and no heat is imparted to the slice from the toaster walls. As the toaster heats up and as the temperature of the walls increases, the draft will increase to automatically increase the speed of the wind motor and thereby shorten the toasting interval. In this manner, the heating periods of successive slices toasted become increasingly shorter until the toaster temperature is stabilized, at which time the wind motor will run at a substantially constant speed to measure substantially uniform toasting periods. Conversely, if the toaster be permitted to cool down, and then again operated to toast a slice, the toasting interval will be increased due to the fact that the velocities of the draft and of the wind motor will be less. The time interval of every toasting cycle depends upon all variations in toaster temperature occurring during that cycle.

It is to be understood that while the toasting operation has been shown as terminated by opening the switch 31 and by ejecting the toast, the timing mechanism may also be used to terminate the toasting either by opening the switch 31 alone or merely by ejecting the toast without opening the switch.

The basic time setting of the toaster may be varied by adjusting the position of the abutment 41. This may be accomplished by means of an operating knob 64 accessible at the front of the toaster and driving the abutment 41 through a shaft 65, bevel gears 66, shaft 67, bevel gears 68, shaft 69 and bevel gears 70.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. Cooking apparatus comprising a casing, a heat-treating chamber within said casing, heating means for said chamber for supplying the cooking heat, said casing being provided with air inlet and outlet openings in the lower and upper portions thereof through which a draft of air is induced to flow by the heat of said apparatus, the velocity of said draft increasing as the temperature of said apparatus increases and decreasing as said temperature decreases, a self-starting timing mechanism constructed and arranged so as to be operated by said air draft, the velocity of said timing mechanism varying with the velocity of said air draft, and hence with the temperature of said apparatus, and means controlled by said timing mechanism for terminating the cooking period responsively to the velocity of said timing mechanism, and hence in accordance with the temperature of said apparatus.

2. An electric toaster comprising a casing, a toasting chamber in said casing, electric heating means within said casing for heating said chamber, said casing being provided with openings positioned so that a draft of air is induced to flow through the casing by the heat generated by said heating means, the velocity of said air draft varying with the temperature in said casing, means controlling said heating means to shut off the heat, and a self-starting wind motor located in said draft, the velocity of said wind motor varying with the velocity of said draft, and thereby in accordance with the temperature in said casing and means connecting said wind motor with said controlling means to operate said controlling means in accordance with the velocity of said wind motor so that the toasting period is reduced as the velocity of said motor is increased, and is increased as said velocity is reduced.

3. A toaster comprising a heating chamber having openings at the bottom and top through which an air draft may flow, means for heating said chamber, the heating means when operating to heat said chamber inducing the flow of an air draft up through the chamber, a self-starting wind wheel mounted below the opening at the bottom of said chamber constructed and arranged to be operated by said draft and at a velocity which is proportional to the velocity of said draft, and means operated in accordance with the velocity of said wind wheel for terminating the toasting operation.

4. An electric toaster comprising a casing, a base supporting said casing, a heating chamber in said casing, electric heating means for heating said chamber, said base having an opening below said heating chamber through which a draft of air induced by said heating means flows, a self-starting wind wheel located in said opening constructed and arranged to be operated by said draft, the velocity of said wheel being proportional to the velocity of said draft, a switch for said heating means located on said base, and a driving connection between said wheel and said switch operating said switch to open to terminate the toasting period, the interval of which depends directly upon the speed of said wheel, and hence upon the velocity of said draft.

5. A toaster comprising a casing housing a heating chamber, said casing having lower and upper air intake and egress openings, electric heating means for said heating chamber, a switch controlling said heating means, said heating means inducing a draft of air to flow into said intake opening, up through said casing and out of said egress opening, said draft having a velocity proportional to the temperature of said toaster, a slice support in said heating chamber movable between said toasting and non-toasting positions, means for operating said holder from said non-toasting to said toasting position, said means operating said switch to energize said heater when said holder is moved to said toasting position, a self-starting wind wheel located in said draft constructed and arranged to be operated thereby and at a velocity proportional to that of the draft and hence to the temperature of said toaster, and means connecting said wind wheel with said switch so as to operate it to deenergize said heating means when said wind wheel has turned through a predetermined number of revolutions.

6. An electric toaster comprising a casing having lower and upper air intake and egress openings, a toasting chamber within said casing, electric heating means within said casing for said toasting chamber, said heating means inducing a draft of air to flow in said air intake opening, up through said casing and out of said air egress opening, the velocity of said draft depending up the temperature of said toaster, a switch controlling said heating means, a self-starting air wheel located in said draft for operating said switch so as to terminate the toasting period, the air wheel being constructed and arranged so that its velocity is proportional to the velocity of said draft, whereby the toasting period is varied as the temperature of said toaster varies, and means controlling said switch to adjust the basic time setting of said toasting period.

7. A bread toaster comprising a casing, a toasting chamber within said casing, heating means within said casing for heating said toasting chamber, a slice holder in said chamber movable between toasting and non-toasting positions, means biasing said holder to its non-toasting position, locking means for holding said holder in said toasting position, said casing being provided with lower air inlet and upper air outlet openings, said heating means when operating to apply heat to said chamber inducing an air draft to flow into said inlet opening, up through said casing and out through said outlet opening, the velocity of said draft varying directly with the temperature of said toaster, a self-starting wind wheel within said casing located in said air draft and constructed and arranged to operate at a speed proportional to the velocity of said air draft, and means driven by said wind wheel for releasing said locking means at the end of the toasting interval.

HEBER L. NEWELL.